MAGNETIC SHIFT REGISTER

Original Filed Oct. 26, 1955 2 Sheets-Sheet 1

INVENTOR.
ROBERT C. KELNER

BY

Philip J McFarland
ATTORNEY

Nov. 23, 1965 R. C. KELNER 3,219,987

MAGNETIC SHIFT REGISTER

Original Filed Oct. 26, 1955 2 Sheets-Sheet 2

INVENTOR.
ROBERT C. KELNER
BY
[signature]
ATTORNEY 3,219,987
MAGNETIC SHIFT REGISTER
Robert C. Kelner, Concord, Mass., assignor to Laboratory for Electronics, Inc., Boston, Mass., a corporation of Delaware
Original application Oct. 26, 1955, Ser. No. 542,968, now Patent No. 3,083,352, dated Mar. 26, 1963. Divided and this application July 19, 1962, Ser. No. 212,757
2 Claims. (Cl. 340—174)

The present invention relates in general to new and improved electrical data processing circuits, in particular magnetic shift registers.

This application is a division of application Serial No. 542,968, filed October 26, 1955, entitled Magnetic Shift Register (now U.S. Patent No. 3,083,352).

The term magnetic shift register applies to a device employing a series of magnetic cores each having a substantially rectangular hysteresis loop characteristic, i.e., the residual flux density of such a core constitutes a large part of the saturation flux density. Accordingly, such cores may exist in one or the other of two magnetic states corresponding to positive or negative residual flux density, arbitrarily labeled the ZERO and ONE states, respectively. Application of the requisite amount of magnetomotive force in one direction, e.g., positive, to a core in the ZERO state will effect no change in the core, while application of the same force in the negative direction will change the core to the ONE state. The reverse situation obtains upon application of magnetomotive force to a core in the ONE state. The applicability of such bistable magnetic cores to the storage of information reduced to binary form is at this time well established in the art.

In a magnetic shift register, a series of cores are electrically linked so that binary information on any one core may be passed on to the succeeding core upon the application of a shift pulse simultaneously applied to all the cores in the series. Such a shift pulse is applied to individual coils wound upon the respective cores, thereby producing the necessary magnetomotive force to change the magnetic state of the cores, as explained above. If the application of the shift pulse changes the magnetic state of the core, the shift pulse winding will appear as a primarily resistive impedance to the source applied across the winding. If, however, no change is effected in the magnetic state of the core, the winding will appear as a short circuit to the source.

Heretofore, it has been the practice to connect all shift pulse windings of a register in series, the whole series combination being excited from the same source so as to insure the simultaneous application of a shift pulse to all the cores. This mode of excitation, while desirable from the viewpoint of insuring uniformity of excitation, presents many disadvantages. It restricts access to the shift register at other than input and output terminals, since operation of the circuit is dependent upon the continuity of the series combination. Furthermore, a waste of power is incurred at any time when less than the total number of series connected windings appears resistive. Also, the voltage applied across each shift winding may vary from a value of E, the total voltage applied to the series combination, to a value of $E/n$, "$n$" being the total number of windings in series connection, depending on the total number of windings which are resistive while the shift pulse endures. Most important of all, at high frequencies of operation stray capacities exist between the high impedance windings and ground which have the effect of applying undesired signals across the windings and effect spurious settings of the magnetic cores.

The need for reliability in magnetic shift registers has long been one of the most pressing problems encountered in this art. Consider, for example, a shift register which employs upward of one thousand cores. If a mathematical problem is set up, a spurious setting on one of the cores can destroy the value of the entire calculation. Furthermore, since such cores may also be used for the storage of information, a spurious setting may cause information to be permanently lost. Similarly, economic power consumption is essential where an appreciable number of cores is used. Convenient access to individual stages is equally important in multicore applications.

Accordingly, it is an object of my invention to provide new and improved shift register which is not subject to the foregoing disadvantages.

It is a further object of my invention to provide a shift register wherein ready access may be had to the circuit during its operation.

It is another object of my invention to provide a shift register which is economical in its consumption of driving power.

It is still another object of my invention to provide a shift register whose shift windings are excited by a voltage of constant amplitude.

It is an additional object of my invention to provide a shift register which is reliable in operation and is not subject to spurious core settings.

Briefly stated, the magnetic shift register circuit of my invention contemplates the use of a parallel drive system to supply a shift pulse simultaneously to the shift pulse windings. The latter may consist of one or more separate coils wound on each core, directly excited from a pulse source.

These and other novel features of my invention together with further objects and advantages thereof will become more apparent from the following detailed specification with reference to the accompanying drawings, in which.

Figure 1:
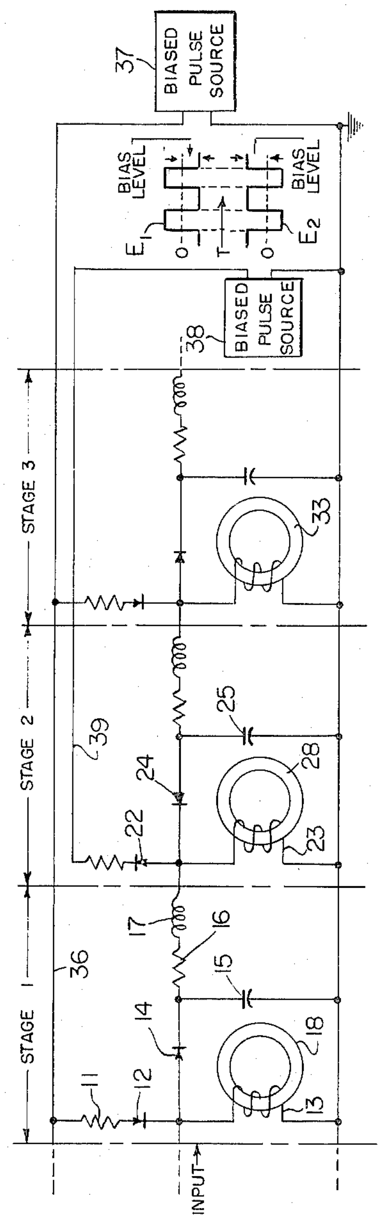
FIG. 1 illustrates one embodiment of my invention, employing two pulse sources and a biasing arrangement.

With reference now to the drawings, and more particularly to FIG. 1 thereof, three substantially identical states of a magnetic shift register are shown, the number of stages in the register being determined by the number of bits of binary information it is desired to store, each bit of information requiring a separate stage. Alternate stages, e.g. Stages 1 and 3, are connected across negatively biased pulse source 37 by means of bus 36 for simultaneously excitation with positive shift pulses. One end of resistor 11 is connected to bus 36 and the other end connects with the input terminal of unilaterally conductive means, which may be a conventional diode rectifier. The output terminal thereof forms a junction point with one end of coil 13, the latter being the only coil wound on a preferably toroidal magnetic core 18. Core 18 may exhibit a substantially rectangular hysteresis characteristic having a residual flux density which constitutes a large portion of the saturation flux density. The other end of coil 13 is connected to ground. Input information to Stage 1 is applied between said junction point and ground. Said junction point is further connected to the input terminal of rectifier 14 which may also be a diode rectifier, whose output terminal forms a second junction point with one end of resistor 16. Condenser 15 is connected between said second junction point and ground. The other end of resistor 16 is connected to inductance coil 17 which in turn connects to a third junction point forming the input to Stage 2. Stage 2 differs from Stage 1 in the poling of rectifiers 22 and 24 respectively which are connected for conducting current in the reverse or opposite direction from that of rectifiers 12 and 14 respectively, in Stage 1. Stage 2, as well as any subsequent identically connected even-numbered stages (not shown), is excited with negative shift pulses from positively biased pulse source 38, via bus 39. Apart from these differences, Stage 2 is identical to Stage 1 as shown. Stage 3 is identical in every respect to Stage 1.

The operation of the shift register illustrated in FIG. 1 is as follows: Shift pulses $E_1$ and $E_2$ of opposite polarity and preferably equal duration are simultaneously generated by pulse generators 37 and 38, each generator being biased to a potential whose polarity is opposite to that of its generated pulse. During the period of shift pulse $E_1$, current flows through resistor 11, diode 12 and winding 13 of magnetic core 18 to ground. If core 18 has been previously saturated so as to be in the ONE magnetic state, the instant current will reset the core to the ZERO magnetic state. When this occurs, winding 13 will appear as a resistance to the current causing the latter to charge up condenser 15 through diode rectifier 14. If core 18 is in the ZERO magnetic state at the time shift pulse $E_1$ is applied, no change occurs in its magnetic state. At such time, winding 13 presents a short circuit to ground to the current and condenser 15 will remain uncharged. The action is identical in Stage 3. In Stage 2, however, the operation differs to the extent that a negative shift pulse is applied causing current to flow in the opposite direction. The sense of saturation of core 28 will then be reversed from that of cores 18 and 33, but such reversed sense of saturation is arbitrarily deemed to correspond to the ZERO state as far as core 28 and subsequent cores in even-numbered stages are concerned. Similarly, condenser 25 will charge up with reversed polarity. If, upon application of shift pulse $E_2$, core 28 is already in the ZERO magnetic state, winding 23 will appear as a short circuit path and condenser 25 will fail to charge up.

Accordingly, the simultaneous application of pulses from sources 37 and 38 to respective stages of the shift register will "clear" the core of each stage, i.e., it will cause each core to assume the ZERO magnetic state, either by retaining the latter or changing to it.

The discharge of the accumulated charge on condenser 15 is prevented by unilaterally conductive diode rectifiers 14 and 24. After the shift pulse has subsided, the positive bias voltage applied to rectifier 22 via bus 39 renders this rectifier non-conductive. Condenser 15, resistor 16 and inductance 17 constitute a vestigial delay line whose time constant is chosen to be greater than the duration of the shift pulse. Thus, at the time the delayed pulse arrives at the junction point connecting core winding 23 and rectifier 22, the positive bias on the latter makes it non-conductive. The only possible discharge path which remains open leads through core winding 23 to ground. The polarity of the delayed pulse is such as to set core 28, which had assumed the ZERO state following the shift pulse, to the ONE state. To state the operation somewhat differently, that bit of information which formerly was in core 18 of Stage 1 has been transferred to the core 28 of Stage 2. The operation, with the exception of reversed current direction and reversed sense of magnetic core saturation in even-numbered stages, is the same in all stages of the register and is repeated cyclically. Thus, one bit of information in the first stage of an *n*-stage register will move down to the *n*th stage in $n-1$ cycles.

Figure 2:
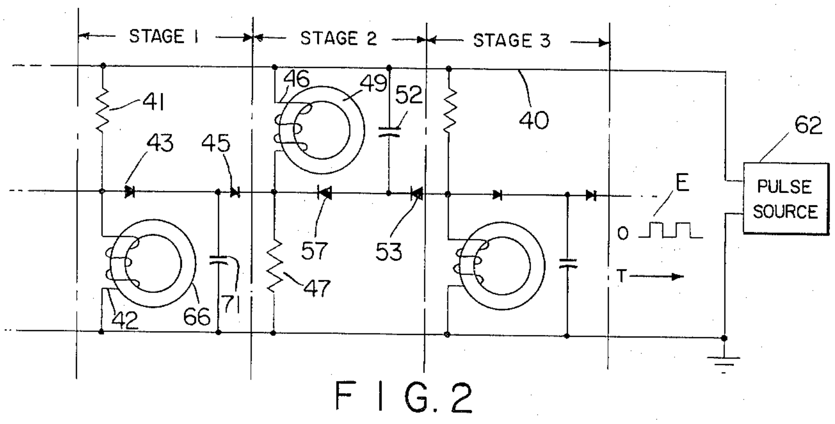
FIG. 2 illustrates a further embodiment of my invention employing one pulse source.

Referring now to FIG. 2, the circuit illustrated requires only one shift pulse source providing much lower power for a given operating speed.

Three stages are illustrated, alternate stages again being identical in structure and operation. Pulse source 62 generates pulses of energy which are applied between bus 40 and ground. Pulses are supplied to Stage 1 through resistor 41 connected to the bus on one side and a first junction point on the other side. Magnetic core 66, preferably of toroidal shape, has a single winding 42 wound on it, connected between the first junction point and ground. Unilaterally conductive means 43 and 45, which may be diode rectifiers, are series connected between said first junction point and a second junction point in Stage 2 and are poled alike to conduct current flowing into Stage 2. Storage condenser 71 is connected between a point connecting the two rectifiers referred to above and ground. Magnetic core 49 in Stage 2, similarly has a winding 46 wound on it, which winding is connected between bus 40 and the aforementioned second junction point. Diode rectifiers 57 and 53 are series connected between the second junction point and a third junction point in Stage 3 and are poled alike to conduct current in a direction opposite to that of the rectifiers in Stage 1. Condenser 52 is connected between bus 40 and a point joining rectifiers 57 and 53. Stage 3 is again identical to Stage 1.

The operation is similar to that of the circuit of FIG. 1. If magnetic core 66 is in the ONE state, pulse E will reset it to the ZERO state, thereby charging condenser 71, while no action occurs if the core is already in the ZERO state. Similar actions occur in all other stages, even-numbered stages again having a reversed current direction and a reversed sense of core saturation, as compared to odd-numbered stages. Resistors 41 and 47 respectively are so chosen as to approximate in value the resistive impedance of windings 42 and 46 respectively, at the moment the respective associated cores change their magnetic state. Accordingly, for a pulse of magnitude E, approximately one half the voltage will be applied across condensers 71 and 52 respectively, permitting them to charge up to a theoretical maximum voltage of $E/2$. In practice, the duration of the pulse E is so brief as to permit the condensers to charge only along the linear portion of their characteristic. Therefore, while the pulse endures, the input terminal of rectifier 45 is at a potential $E/2$, while the output terminal is at a potential $\leqq E/2$. Hence, the rectifier is non-conductive and no cahrge from condenser 71 can reach core 49 until the pulse has subsided. At that point, since bus 40 is then in effect connected to ground, resistor 47 and core winding 46 which have substantially equal resistance values, are effectively in parallel with condenser 71. The charge on condenser 71 then divides equally between them upon discharge. A similar operation obtains in the other stages. Without the series combination of resistor 16 and inductor 17 of FIG. 1 to contend with, the discharge time of the condenser which is equivalent to the time for setting the core (i.e. changing its magnetic state from ZERO to ONE), may be comparable with the reset time. Thus for a given frequency, the duty cycle of the source which generates pulse E, that is the percentage of time during which the pulses occur, may be as much as 50%. For the same average power as in the embodiment of FIG. 1, the required peak power is reduced by a factor 5. Important economies are effected thereby in the size of the pulse generator. Moreover, less power is required in the circuit of FIG. 2 since the power loss due to the delay line resistor is eliminated, rectifier 45 completely isolating condenser 71 for the duration of pulse $E_1$.

Figure 3:
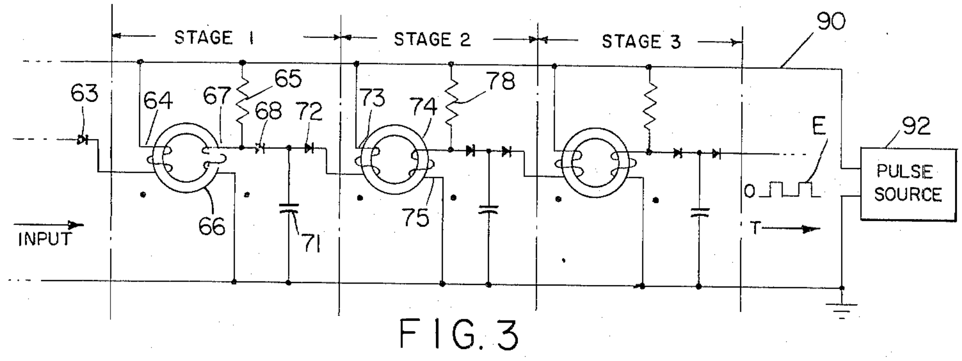
FIG. 3 illustrates an embodiment of my invention suitable for parallel read-out.

FIG. 3 is a modification of FIG. 2 which is suitable for parallel read-out. It often becomes necessary in working with magnetic shift registers to know, at a given instant, the amplitude of the voltage in all the core winding with respect to ground which is due to the pulse only, without regard to any superimposed bias potential. It is further desirable in such read-out of the various core winding voltages to have all of them of the same polarity. FIG. 3 illustrates a circuit which fulfills these requirements without sacrificing the advantages of the circuit of FIG. 2. As shown in the drawing, two windings per core are necessary, pulses on the ends marked by a dot being in phase with each other when there is a change in the magnetic state of the core.

Pulse source 92 generates positive pulses which are applied between bus 90 and ground. Core 66 of Stage 1 has windings 64 and 67 wound upon it, winding 64 being connected to bus 90 and rectifier 63. Winding 67 is connected between a junction point and ground. Resistor 65 is connected between bus 90 and the junction point. Two unilaterally conductive means, 68 and 72, which may be diode rectifiers, are series connected between the junction point and winding 73 in Stage 2 and are poled to conduct current into Stage 2. Energy storage condenser 71 is connected between a point joining the two rectifiers and ground. All other stages of the register are connected in identical fashion.

In operation, application of a positive voltage pulse will affect core 66 only through winding 67 since no current due to this pulse can flow in winding 64, owing to the reverse poling of rectifier 63. If core 66 previously was in the ONE state, pulse E will reset it to ZERO, charging condenser 71 at the same time. Owing to the positive voltage on its output terminal, rectifier 72 is non-conductive while the pulse endures and condenser 71 will discharge into winding 73 only after the pulse has subsided, setting core 74 to the ONE state at such time and exciting winding 75 by the transformer action of core 74. Information may then be read out of windings 67 and 75. Current flow in winding 75 is dissipated in resistor 78.

The latter represents a loss of power which may be prevented by placing a rectifier in series with resistor 78 (and corresponding rectifiers in the respective stages), said rectifier being poled to pass current to winding 75. A negative bias potential applied across the bus bars will then make such rectifier non-conductive at the time of condenser discharge when no pulse is applied from the pulse generator.

Figure 4:
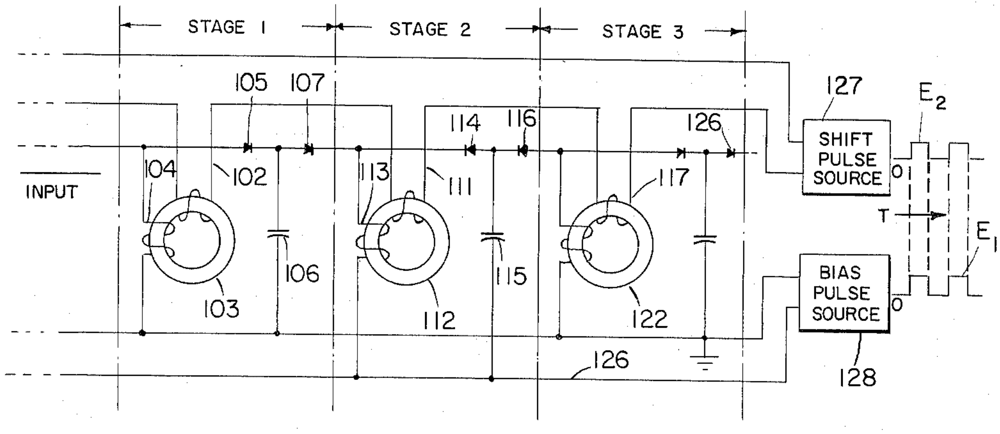
FIG. 4 illustrates a further embodiment of my invention employing a combination of series and parallel drive.

If it is desired to eliminate resistor power losses entirely, the circuit of FIG. 4 may be used. Shift pulse source 127 supplies pulses through shift pulse windings 102, 111, and 117 which are series connected across the source. Bias source 128 applies bias pulses between bus bar 26 and ground. In addition to shift pulse winding 102, magnetic core 103, which is preferably of toroidal shape, has bias winding 104 wound upon it, said winding being connected between a first junction point and ground. Unilaterally conductive means 105 and 107, preferably diode rectifiers, are series connected between a first and second junction point and poled for transmitting current to Stage 2. Condenser 106 is connected between a point joining the two diode rectifiers and ground. In Stage 2, magnetic core 112 has, in addition to shift pulse winding 111, bias winding 113 wound upon it, the latter winding being connected between the second junction point and bus 126. Diode rectifiers 114 and 116 are series connected between the second junction point and a third junction point in Stage 3, and are poled in reverse direction from the diode rectifiers in Stage 1. Condenser 115 is connected between a point joining the two rectifiers and bus 126. Stage 3 is again identical to Stage 1.

In operation, series windings 102, 111, and 117, which receive positive bias pulses $E_1$ from source 128, now supply the power required to rest cores 102, 111, and 122 to the ZERO magnetic state. Bias pulses $E_1$, supplied in synchronism with shift pulses $E_2$ and preferably of equal duration, merely serve to make rectifiers 107, 116 and 126 non-conductive during the pulse period. Thus, upon application of a shift pulse $E_2$ to winding 102, core

103 is reset if it formerly was in the ONE state. By transformer action the core transfers energy to winding 104 which in turn charges condenser 106. Bias pulse $E_1$ prevents discharge of the condenser by biasing the output terminal of rectifier 107 positively. Upon the simultaneous cessation of pulses $E_1$ and $E_2$, condenser 106 discharges through winding 113 setting the core to the ONE state. The operation is similar in all stages of the shift register. This circuit has the advantage of eliminating resistive losses in the circuit, thus requiring less power from the pulse generator . The number of turns required in series connected windings 102, 111 and 117 respectively, is small thereby keeping the impedance per winding low. Accordingly, stray capacity between the series winding, and ground is not a serious problem at high frequencies. One satisfactory arrangement which was used in practice, employed two turns in series winding 102 to forty-five turns in bias winding 104.

Figure 5:
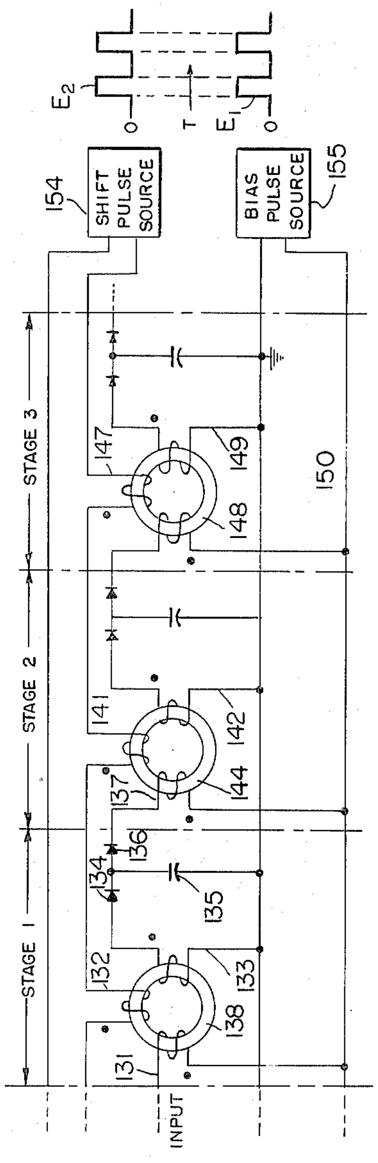
FIG. 5 illustrates another embodiment of my invention suitable for parallel read-out.

FIG. 5 illustrates a modification of FIG. 4 suitable for parallel read-out. In analogous fashion to the arrangement of FIG. 3, the addition of another winding makes it possible to simultaneously read the condition of all the cores by measuring the voltage across one of the windings with respect to ground. Shift pulse source 154 applies pulses $E_2$ to shift pulse windings 132, 141 and 147 connected in series across it. Bias pulse source 155 applies bias pulses between bus 156 and ground. Each of the bistable magnetic cores 138, 144, and 148, preferably of toroidal shape, carries two bias windings, in addition to a shift pulse winding, the windings being so arranged on each core to have pulses on the terminals which are indicated by a dot in the drawing, in phase when there is a change in the magnetic state of the core. In Stage 1, winding 131 is connected between the input terminal and bus 156. Winding 133 has one terminal connected to ground and the other terminal connected to a diode rectifier 134. The latter is series connected to diode rectifier 136, both being poled for transmitting current into Stage 2. Condenser 135 is connected between a point joining the rectifiers and ground. The output terminal of rectifier 136 is then connected to winding 137 which is wound on core 144 in Stage 2. All stages are connected identically.

The operation of the circuit of FIG. 5 follows that of FIG. 4, the only difference being that information stored on the cores is not transferred directly from the bias winding of one core to the bias winding of a subsequent core, but passes from the output winding, e.g., winding 133 of core 138 to the input winding 137 of core 144, reaching output winding 142 by means of the transformer action of core 144.

It will be readily seen from the drawing that the addition of another winding makes parallel read-out possible provided the windings are properly phased, as explained above. Windings 133, 142, and 149, will then display voltages of the same polarity with respect to ground, enabling an observer to make a direct comparison between them.

Having thus described my invention, it will be apparent that numerous modifications and departures may now be made by those skilled in the art. Consequently, the invention herein disclosed is to be construed as limited only by the spirit and scope of the appended claims.

I claim:

1. In a magnetic shift register capable of storing at least two binary digits of information, first and second means for respectively supplying synchronous shift pulses of opposite polarity, each of said first and second means adapted to be biased in opposition to its respective pulse polarity, at least two magnetic cores each having a substantially rectangular hysteresis characteristic and capable, respectively, of existing in one of two magnetic states, a single winding wound upon a first one of said cores, said winding having an input terminal, a first unilaterally conductive element connected to derive positive shift pulses from said first means for application to said winding, a first storage means adapted to receive information from said first core upon a change in the magnetic state thereof, first pulse delay means for transferring information from said first storage means to the second one of said cores, said first storage means cooperating with said first pulse delay means to retard the transfer of information for a time period at least equal to the duration of one of said positive shift pulses, a single winding wound upon a second one of said magnetic cores connected to transmit said delayed information to said second core, a second unilaterally conductive element connected to derive negative shift pulses from said second means for application to the latter winding, a second storage means adapted to receive information from said second core upon a change in the magnetic state thereof, second pulse delay means for transferring information from said second storage means, said second storage means cooperating with said second pulse delay means to retard the transfer of information for a time period at least equal to the duration of one of said negative shift pulses, said bias voltage operating to make said first and second unilaterally conductive elements non-conductive during the non-pulse period; whereby information supplied to said input terminal for storage in said first magnetic core is passed on for storage to said second magnetic core upon the application of said shift pulses.

2. In a magnetic shift register for processing binary information, first means for applying a negative bias potential between a first bus and ground, means for superimposing positive shift pulses of amplitude greater than said negative bias potential upon said negative potential, second means for applying a positive bias potential between a second bus and ground, means for superimposing negative shift pulses of amplitude greater than said positive bias potential upon said positive potential, at least two register stages, a first of said stages being positively pulsed from said first bus, said first stage comprising a first toroidal, magnetically bistable core having a substantially rectangular hysteresis characteristic, a first pair of diode rectifiers serially connected at a first junction point and poled alike for conducting current in one direction, at first resistor connected to said first bus, said first pair of diode rectifiers being connected between said first resistor and a second junction point, a first shift pulse winding wound on said first magnetic core connected between said first junction point and ground, a first condenser connected between said second junction point and ground, a second resistor having one terminal connected to said second junction point, a first inductance coil having one end connected to the other terminal of said second resistor and having the other end connected to a third junction point, said first condenser cooperating with said second resistor and said first inductance coil to form a vestigial delay line having a time constant greater than the duration of one of said positive pulses; a second one of said stages excited from said second bus bar by negative shift pulses of substantially equal amplitude and duration as said positive pulses and in synchronism therewith, comprising a second toroidal, magnetically bistable core having a substantially rectangular hysteresis characteristic, a second pair of diode rectifiers serially connected at said third junction point and poled alike for conducting current in a direction opposite to said one direction, a third resistor connected to said second bus, said second pair of diode rectifiers being connected between said third resistor and a fourth junction point, a second shift pulse winding wound upon said second magnetic core connected between said fourth junction point and ground, a fourth resistor having one terminal connected to said fourth junction point, a second inductance coil having one end connected to the other terminal of said fourth resistor and having the other end connected to a fifth junction point, said second condenser cooperating with said fourth resistor and said second inductance coil to form a second vestigial delay line having a time constant greater than the duration of one of said negative pulses, whereby input information applied to the first junction point and stored in the first magnetic core is passed on for storage to the second magnetic core upon the application of shift pulses.

References Cited by the Examiner

UNITED STATES PATENTS

| | | | |
|---|---|---|---|
| 2,888,667 | 5/1959 | Schmitt | 340—174 |
| 2,907,006 | 9/1959 | Eckert | 340—174 |
| 2,957,165 | 10/1960 | Newhouse | 340—174 |
| 3,090,035 | 5/1963 | Ruhman et al. | 340—174 |

IRVING L. SRAGOW, *Primary Examiner.*